United States Patent [19]
Tumidei

[11] Patent Number: 6,020,948
[45] Date of Patent: Feb. 1, 2000

[54] METHOD FOR ACQUIRING AND PRINTING ELECTRONIC IMAGES ON A PHOTOSENSITIVE MEDIUM, AND AN APPARATUS TO CARRY OUT SAID METHOD

[75] Inventor: Daniele Tumidei, Via-Balducci, Italy

[73] Assignee: Gipco S.r.l., Forti, Italy

[21] Appl. No.: 08/836,235

[22] PCT Filed: Nov. 3, 1995

[86] PCT No.: PCT/IB95/00960

§ 371 Date: Apr. 29, 1997

§ 102(e) Date: Apr. 29, 1997

[87] PCT Pub. No.: WO96/14601

PCT Pub. Date: May 17, 1996

[30] Foreign Application Priority Data

| Nov. 3, 1994 | [IT] | Italy | BO94A0480 |
| Nov. 3, 1994 | [IT] | Italy | BO94A0481 |
| Mar. 1, 1995 | [IT] | Italy | BO95U0034 |
| Aug. 10, 1995 | [IT] | Italy | BO95A0399 |

[51] Int. Cl.$^7$ .................................................. G03B 27/32
[52] U.S. Cl. .............................. 355/27; 355/20; 355/28; 396/625
[58] Field of Search .................. 355/27, 28, 20; 396/625

[56] References Cited

U.S. PATENT DOCUMENTS 4,742,375  5/1988  Kogane et al. ............................. 355/20
4,942,462  7/1990  Shiota ........................................ 355/20

*Primary Examiner*—Alan A. Mathews
*Attorney, Agent, or Firm*—Nims, Howes, Collison Hansen & Lackert

[57] ABSTRACT

The method for acquiring and printing electronic images comprises the following phases: acquiring and digitizing an image by means of input means (1) on a computer 10; displaying said image on primary display means (11) and on secondary display means (12); exposing an end portion (33) of a web (32) of photosensitive medium with the image displayed by said secondary display means (12), through conveying means (50); forwarding the end portion (33) and cutting it by means of a cutter (7), to obtain a sheet (5) of photosensitive medium; developing the hidden image by means of single sheet developing means (40); drying the said sheet (5) and forwarding it to the outside.

The exposing phase preferably comprises three different filtered exposing steps, each one for a different primary color.

30 Claims, 7 Drawing Sheets

METHOD FOR ACQUIRING AND PRINTING ELECTRONIC IMAGES ON A PHOTOSENSITIVE MEDIUM, AND AN APPARATUS TO CARRY OUT SAID METHOD

TECHNICAL FIELD

The present invention relates to the technical field concerned with the production of snapshots, starting from electronically acquired images.

BACKGROUND ART

It is known that reproducing images on a photosensitive medium, printing on a negative photographic paper for instance, in its most traditional aspect, consists of placing said paper in a light-proof room and then exposing it with light, carrying information concerning the image to be printed.

Said light can be generated by a lamp of a suitable power and colour temperature, and is conveyed by an optical device through a film carrying a negative reproduction of the image to be printed, and then to the photosensitive surface of the photographic paper.

The printed image is now in a latency condition and it must be subsequently developed and chemically fixed.

According to further reproduction modes, equally known to a medium-skilled technician, the photosensitive medium can consist of auto-positive photographic paper, either self-developing or not. It can be exposed with a light beam that lightens a film carrying the positive image, and then the photographic paper for a period of a predefined length, or by a direct exposure of the subject to be photographed, by means of a suitable photographic camera.

A common problem of the above mentioned techniques is that it is not possible to have a preview of the reproduction results. That means, it is not possible to see whether the reproduced image quality will be satisfactory, before the photosensitive paper has been developed.

This can be in many cases a non-easily solvable problem. For instance, in those photo studios where a document-format, snapshot pictures service is provided, the result quality depends on several factors. Some of these are easily controllable, like the apparatuses and materials quality, or the subject illumination; some other factors are more casual, like the subject expression during the camera click, or a subject eyes blink just at that moment. A bad issue of the picture will surely disappoint the client, or it will force the photographer to repeat the whole process. This will obviously cause a wasting of time and of photographic material.

DISCLOSURE OF THE INVENTION

It is an object of the present invention to propose a method for immediately reproducing pictures of a subject on a photosensitive medium, which method moreover provides the subject to be able to see a faithful preview of the final issue of the picture being taken before its printing, and to eventually modify the said picture or to take another one.

A further object of the present invention is to propose a method for acquiring, processing and subsequently printing of images, that allows to obtain photographic pictures at considerably lower costs with respect to the known processes, and in a simple and versatile way.

A further object of the present invention is to propose an apparatus for acquiring and printing of images according to the above mentioned method, which apparatus is of extremely compact size, thus suitable to be installed in small size rooms, and being able to automatically perform the whole sequence of image acquisition, transferring to a photosensitive medium and developing the same medium. All this is accomplished in a very simple way and greatly reducing the consumption of energy and of developing products.

All the above mentioned objects are achieved by a method for acquiring and printing images, preferably carried out with an apparatus comprising: electronic input means 1; a computer 10; primary display means 11 and secondary display means 12; a reproduction station 30, fit to print the said images, when displayed by the secondary display means 12, according to a predefined sequence; conveying means 50, placed inside the said reproduction station 30 and fit to receive the light radiation coming from said secondary display means 12 and to convey them towards an exposing room 36; a web 32 of photosensitive medium, which is arranged into a magazine 37 and the end portion 33 of which is placed at the end of said exposing room 36; a cutter 7, to separate a single sheet 5 of photosensitive medium; single sheet developing means 40, fit to receive said sheet 5 and to develop the hidden image; drying means 80 to dry the said sheet 5. The above mentioned method comprises the following operating phases: acquiring a colour image and storing it in a computer 10; displaying the said image on primary display means 11 and on secondary display means 12; exposing a portion 33 of photosensitive medium to light radiation coming from said secondary display means to said portion 33 through conveying means 50; cutting said portion 33 to separate a single sheet 5; developing said sheet 5 by means of single sheet developing means 40.

BRIEF DESCRIPTION OF THE DRAWINGS

The characteristic features of the invention are set out in the following, with particular reference to the accompanying drawings, in which.

BEST MODE OF CARRYING OUT THE INVENTION

Figures 1, 13:
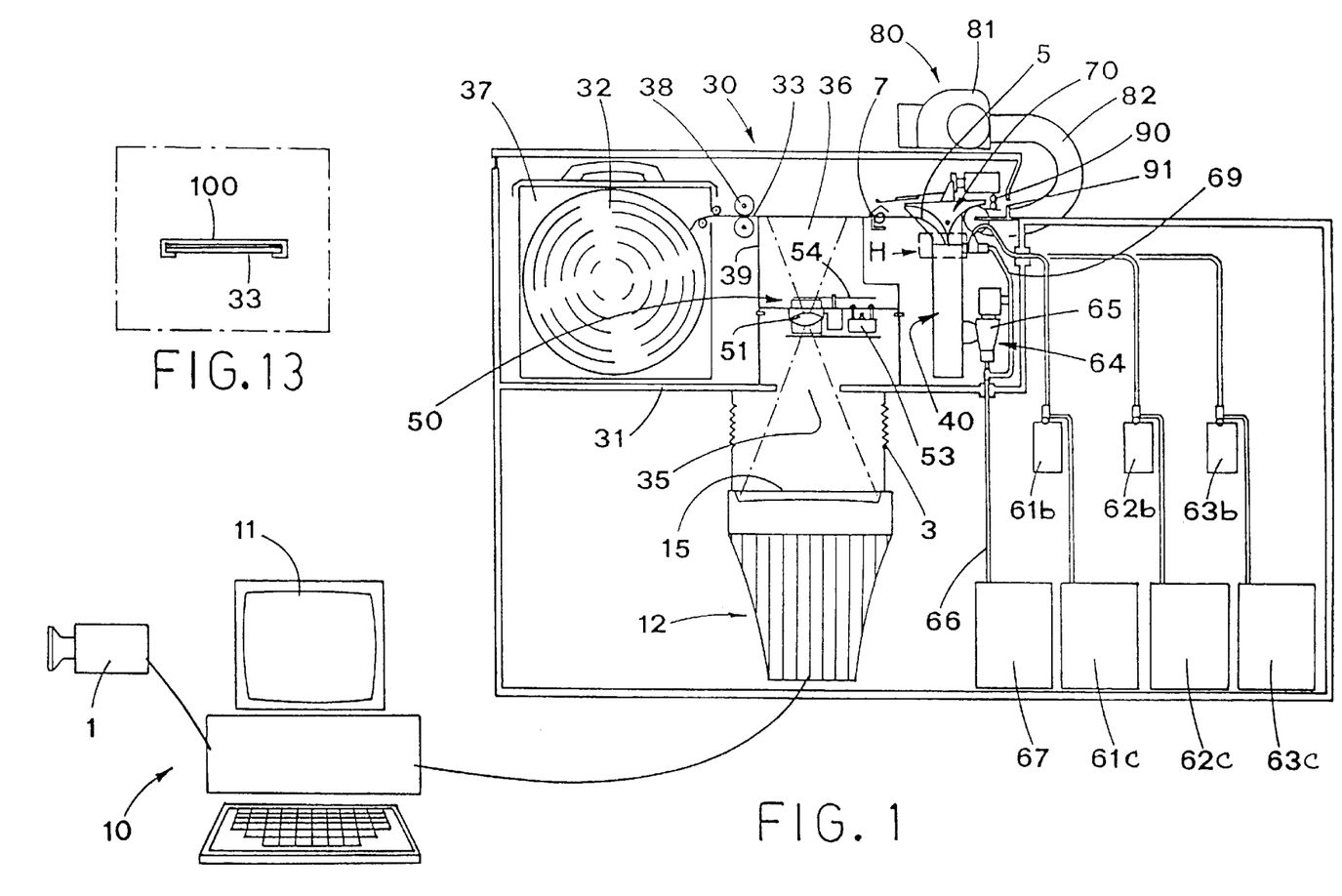
FIG. 1 shows a schematic view of an apparatus that carries out the method according to the present invention.
FIG. 13 shows a section view of a shift guide for the photosensitive medium.
Figure 2:
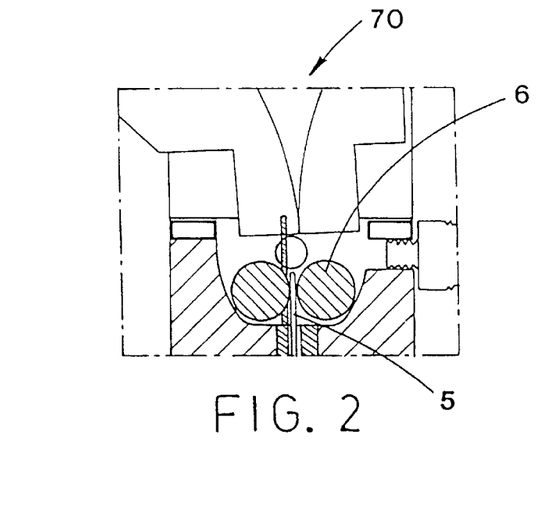
FIG. 2 shows an enlarged particular of FIG. 1, which is identified with H.

With reference to FIG. 1, 10 indicates a computer, that is electrically connected in a known way to image acquisition means 1. The latter consists, for instance, of a colour telecamera, fit to shoot a subject and to send the taken image to said computer 10, to be there digitised and displayed on primary display means 11 and secondary display means 12.

Figure 4:
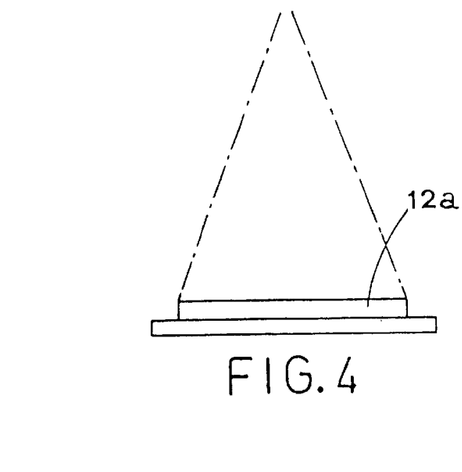
FIG. 4 shows secondary display means of plasma type.
Figure 5:
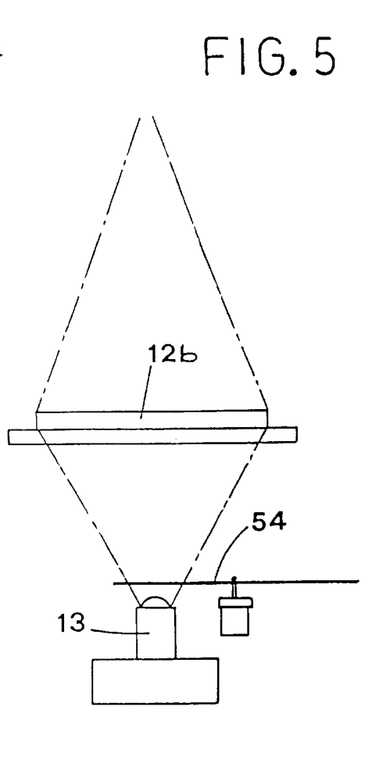
FIG. 5 shows secondary display means of back-lit liquid crystal type.

Said primary display means 11 can be a standard computer colour monitor. The secondary display means is preferably a cathodic tube type colour monitor, but it can be a plasma display (FIG. 4) or a back-lit liquid crystal display as well (FIG. 5).

The image acquisition means in turn can be, other than the above mentioned telecamera, a digital scanner, which is not shown in the accompanying drawings, or a computer mass memory, such as a floppy disk, a hard disk or a magnetic or optical cartridge, in which said image has previously been stored with any known process.

A reproduction station 30 is placed in front of the monitor 12. It is capable to receive the light radiation coming from said monitor 12, generated by the displayed image. The reproduction station comprises a chassis 31, provided with a first opening 35 placed exactly in front of the screen 15 of monitor 12, to allow the radiation generated by the latter to reach the inside of said reproduction station 30. Moreover, a sealing means 3 is interposed between the monitor 12 and the reproduction station 30, to prevent light to enter the same reproduction station through the first opening 35. Sealing means 3 preferably consists of a bellows curtain.

Inside the chassis 31 a removable magazine 37 for a web 32 of photosensitive medium, negative photographic paper for instance, is placed. An end portion 33 of said web comes out from the magazine 37, near a first pair of counter-rotating rollers 38, fit to drag said end portion 33 along a sliding guide 100 (FIG. 13), up to a position which is in front of the first opening 35.

The said sliding guide 100 has preferably a convex shape, with its convexity facing the opening 35 and having a such bending radius that the focus defects, dues to the screen 15 spherical or cylindrical shape, are compensated.

Between the first opening 35 and the end portion 33 a light radiation conveying means 50 is interposed, which consist of a lens 51, of a shutter 53 and of a multiple filter 54. Lens 51 is capable to focus the image coming from the screen 15 just on the end portion 33, in order to expose its photosensitive surface. Shutter 53 allows the image to reach the lens 51, and it is driven by a per se known, and thus not shown in the drawings, electronic control unit. Multiple filter 54 includes three filters, each one of whose is relative to a primary colour. They are fit to filter the primary colours of the displayed image, according to a pre-defined sequence, in a phase relationship with the shutter 53.

The said conveying means 50 and end portion of photosensitive medium 33, together with a side frame 39, define a closed exposing room 36, receiving light exclusively through the lens 51.

Figure 3:
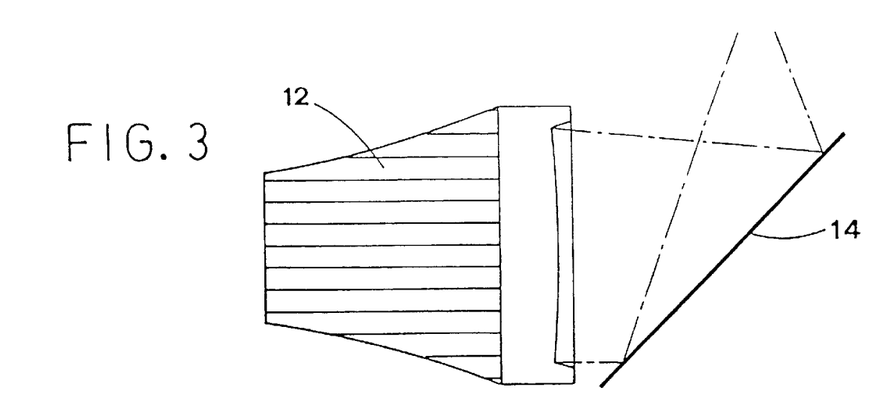
FIG. 3 shows a different arrangement of the secondary display means, of cathodic tube type.

The monitor 12, if needed, can be differently arranged, for instance laterally with respect of the first opening 35 according to a pre-defined angle (see FIG. 3). A mirror 14 is interposed in this case between the opening and the monitor 12, to convey the image to said opening.

In the above stated case, wherein a back-lit, liquid crystal display 12b is used (FIG. 5), the multiple filter 54 can be advantageously interposed between display 12b and a lamp 13.

Figure 14:
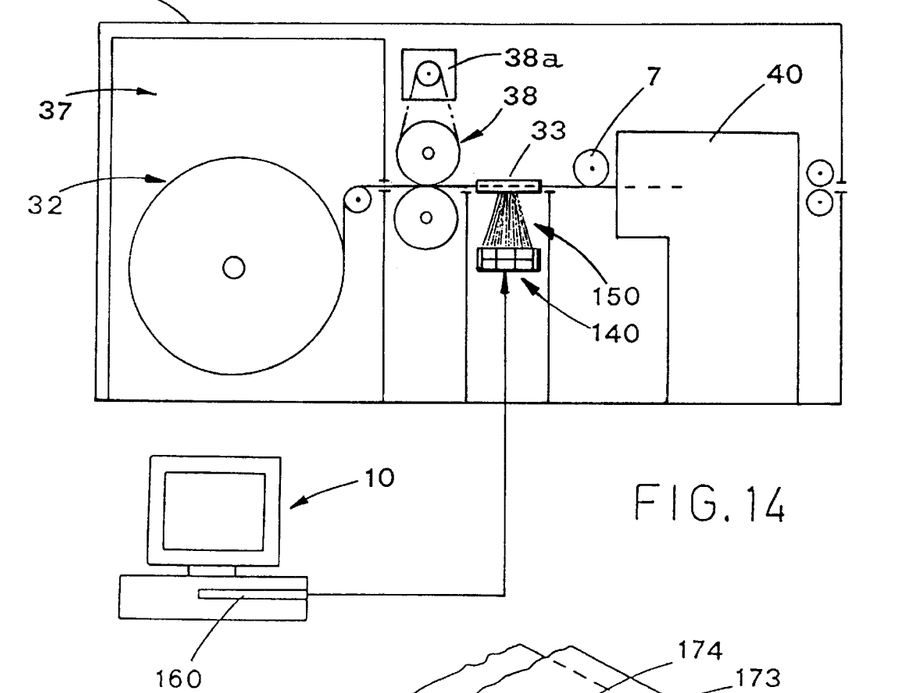
FIG. 14 shows an alternate embodiment of the secondary display means and of the conveying means.

In an alternate embodiment of the secondary display means 12 and of the conveying means 50 (FIG. 14,15 and 16), the display means 12 comprises a first bar 142, a second bar 143 and a third bar 144, which are placed side by side and fixed together. They are arranged in front and transversely with respect to the end portion 33, so as they face the latter substantially for it whole width. Each of said bars is provided with a plurality of light emitting diodes (LED) 145,146,147, each one is capable to produce the light information corresponding to a single pixel. They are placed side by side and closely spaced, in order to obtain the maximum pixel density.

To achieve this purpose without having too much complex electrical connections on the bars, LEDs are preferably arranged by LED groups, e.g 185 on the first bar 142 (see FIG. 16), which are there longitudinally placed side by side. Each group 185 comprises eight LEDs diagonally arranged on an approximately square area 185a. Eight longitudinal, equally spaced LED rows 195 can then be identified on the first bar 142. Each row 195 has also an offset of a pixel with respect to the adjacent one.

Figure 16:
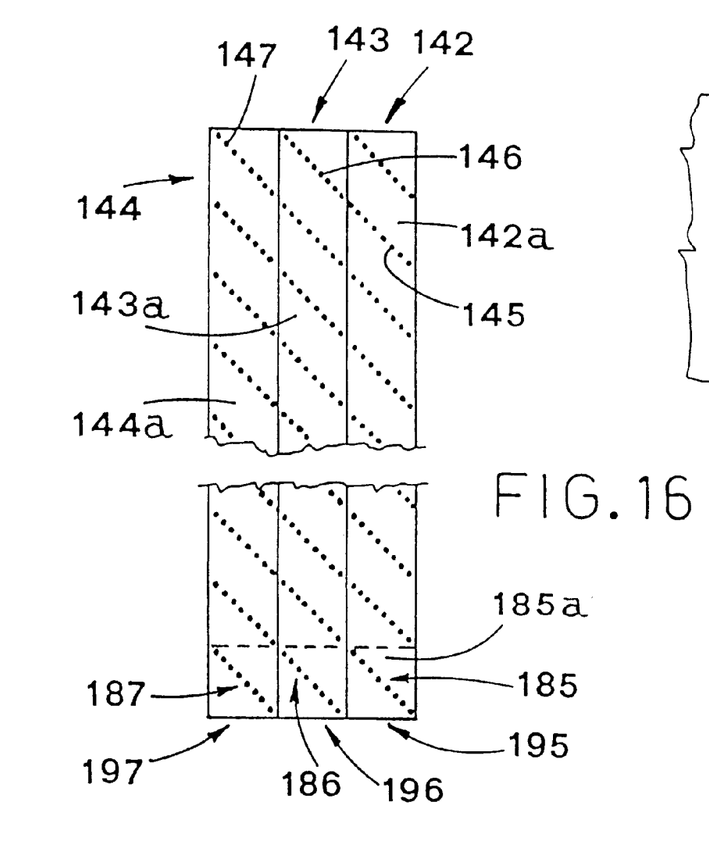
FIG. 16 shows the LEDs arrangement on the secondary display means of FIG. 15.
Figure 17:
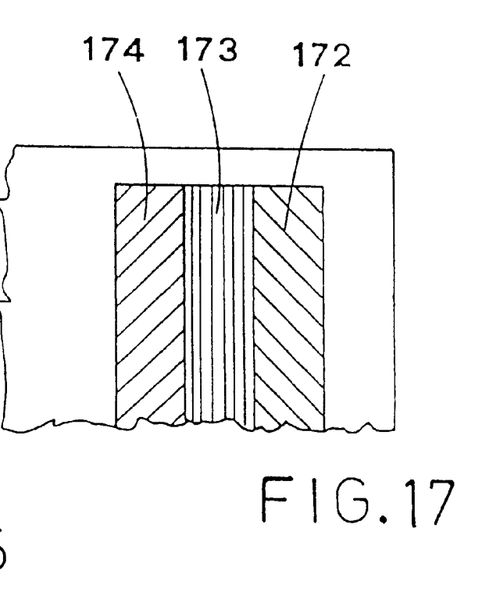
FIG. 17 shows a detail of three image strips.

In the same way, on the second bar 143 and the third bar 144, respective diagonal LED groups 186,187 and longitudinal LED rows 186,197 are defined.

LEDs on each of said bars are able to emit a spot of a primary colour by addition, e.g. red green or blue, when driven by driving means 160. This is preferably a computer board, which is connected to the computer 10. The amount of LEDs that are longitudinally placed on the bars 142,143, 144 defines the number of pixels of the image that will be reproduced on the end portion 33 in a transversal direction, thus determining the image resolution.

Just over the bars 142,143,144 are placed corresponding filters 242,243,244 of the same primary colour, in order to filter differently coloured light eventually coming from LEDs 145,146,147.

The conveying means 50, in the present embodiment, is capable to convey the light radiation coming from each one of LEDs 145,146,146 to each elemental area 106 (FIG. 15) of the end portion 33. Said conveying means 50 is in this case a sheaf 150 of optical fibres 151, tidily arranged according to the LEDs arrangement and mutually kept in place in a known way.

Figure 15:
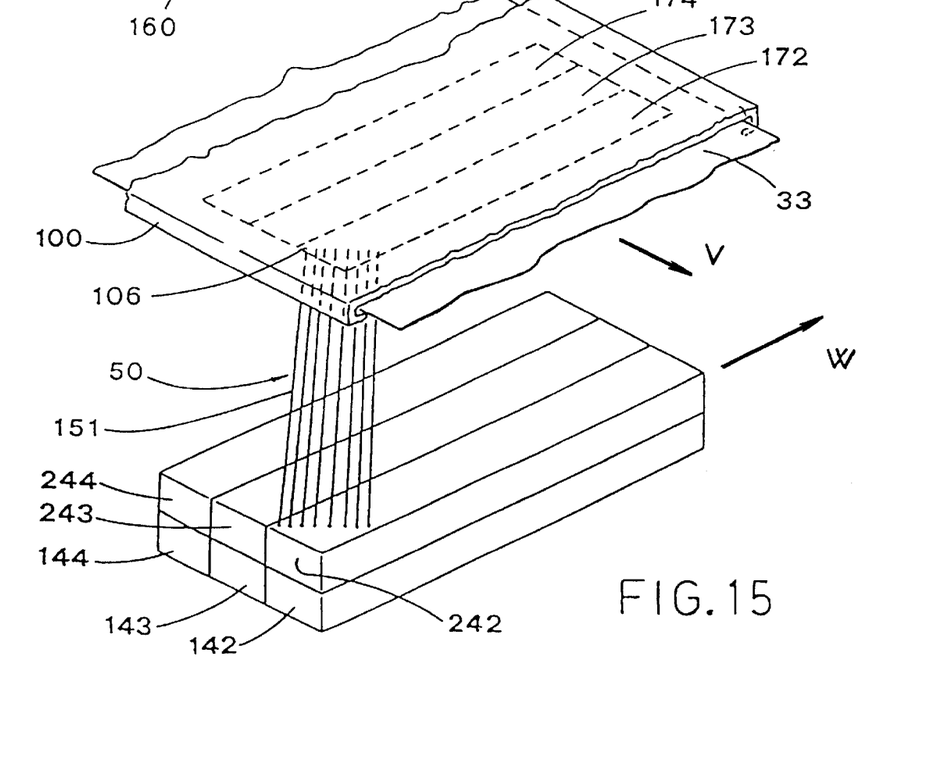
FIG. 15 shows in more details the alternate embodiment of FIG. 14.

The conveying means 50 can also consist of the same lens 51 already described in the previous embodiment, which is arranged to have the end portion 33 in its focal plane. This allows the light spots coming from LEDs 145,146,147 to be reduced in size, thus allowing a less surface density in mounting LEDs on the respective bars.

The first pair of rollers 38 is, in this case, preferably driven by a precision electric motor 38a of a known type, by example a stepper motor or a brushless motor.

In a further embodiment of the secondary display means 12, the LED bars 142,143,144 and the sheaf of optical fibres 151 can be shifted in a W direction, which is perpendicular with respect to the V transporting direction of the photosensitive medium. They are driven step by step, in a known and thus not shown way, by a suitable motor member.

Alternatively, only the sheaf 150 of optical fibers 151 is movable in the W direction, while the bars 142,143,144 are fixed.

Just downstream of the exposing room a cutter 7 is provided, for transversely cutting the end portion 33, to separate it from the said web 32 to a single sheet of photosensitive medium, which will be identified as 5.

Downstream of the cutter 7 a single sheet developing means 40 is provided. It is fit to develop and fix the hidden image on the single sheet 5. Said developing means 40 (see FIG. 6,7,8,9 and 10) comprise a thermoregulating container 41, internally provided with a first hollow 42, communicating on its upper side with a second hollow 43. This latter is open on its upper side. A developing tank 44 is placed inside the said first hollow 42, and its upper end 44a occupies the connection channel between the said second hollow 43 and first hollow 42, thus sealing the latter.

Figure 6:
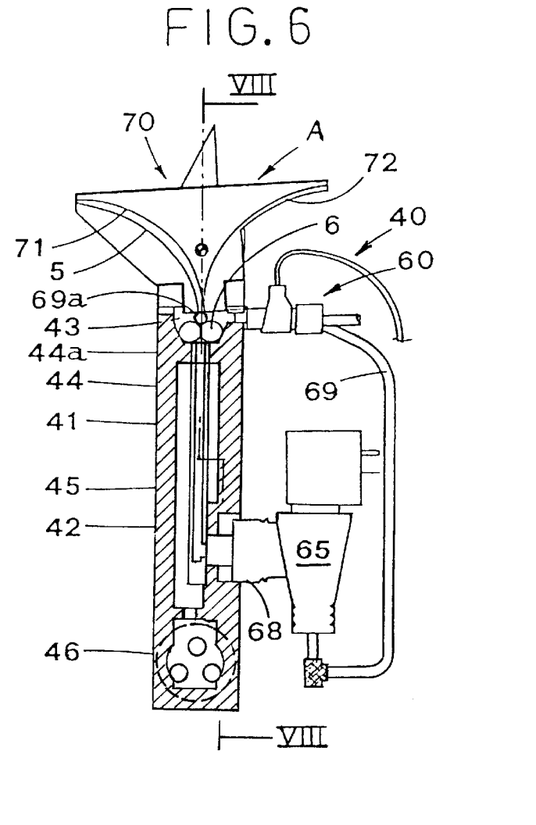
FIG. 6 shows a lateral section view of the developing means.

The developing tank 44 is provided with a laminar hollow 45, open on its upper side and thus communicating with the second hollow 43. It is fit to contain, according to a predefined sequence, products for developing a photosensitive medium. Because these products are usually very acid, the developing tank is preferably made of stainless steel.

The laminar hollow 45 has is sized to arrange the above mentioned sheet 5. It is also very thin, in order to avoid the sheet 5 to roll up when placed inside it, and to save as much developing products as possible.

Immediately above the said laminar hollow 45 a second pair of rollers 6 is provided, rotatably driven by means of a motor member of a known type, according to a predefined sequence.

Rollers 6 are longitudinally arranged in the second hollow 43. They are intended for dragging the sheet 5 alternately toward the inside and the outside of the said second hollow 43.

In the lower part of first hollow 42 thermoregulating means 46 is provided, which is substantially constituted by a heating power resistor 47 and by a temperature sensor 48. Both of them are in tight contact with a thermoregulating fluid. They are operated by the said control unit to keep the temperature of the developing tank 44 at a constant level.

In this case, in order to facilitate the fluid circulation, a recycling pump 49 (FIG. 9) is provided, which is fit to draw fluid near the thermoregulating means 46 and reintroduce it in another zone of the first hollow 42, in order to create a continuous fluid flow inside the same hollow.

Alternately, the power resistor 47 could be a laminar resistor, and meant for being directly coupled to the developing tank 44. In this case, the thermoregulating fluid is not necessary. In some cases, the lower part of the thermoregulating container 41 could be omitted.

Above the second pair of rollers 6 paper guiding means 70 is provided, fit to cyclically convey the sheet 5 toward the rollers 6 and the developing tank 44, and from these outside. Said means 70 comprises a pivotable shaped body, which can be rotated by means of a known operating member, in a phase relationship with the second pair of rollers 6, between an input position A, in which it routes the sheet 5 toward the rollers 6, and an output position B (FIG. 7), in which the sheet 5 is routed to the outside.

Figures 7, 9:
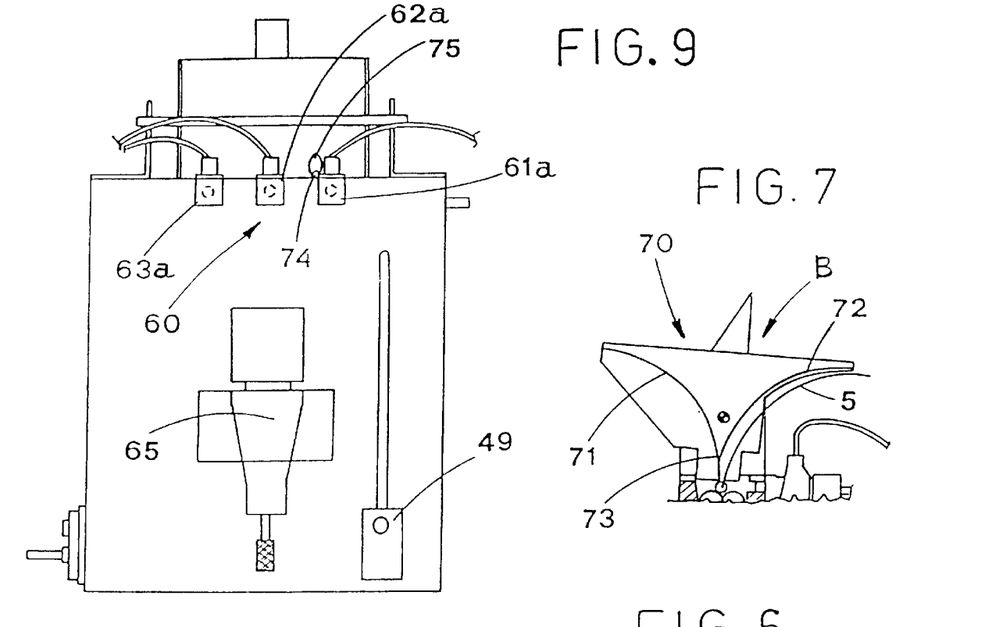
FIG. 7 shows paper-guide means in their output B position.
FIG. 9 shows a front view of the developing means.
Figure 8:
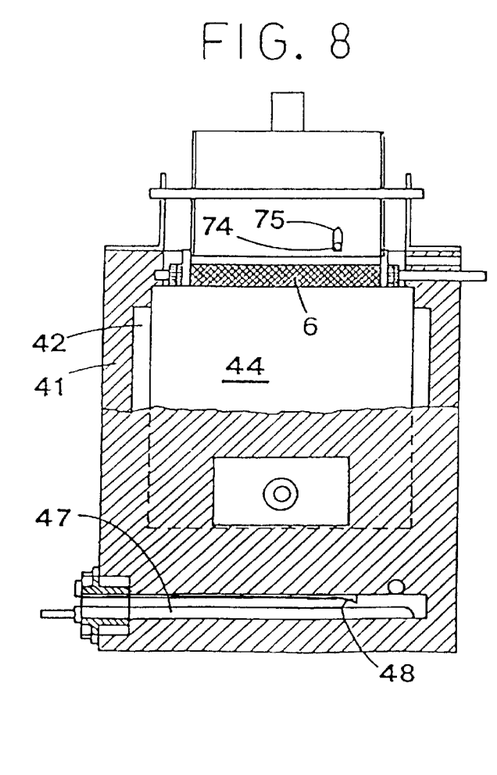
FIG. 8 shows a view according to section VIII—VIII of FIG. 6.

The said shaped body 70 is provided with two oppositely rounded surfaces, respectively an input guiding surface 71 and an output guiding surface 72, extending toward the second pairs of rollers 6 and converging, immediately above there, to form a cusp 73.

Moreover, above the rollers 6 is placed an optical sensor 74 (FIG. 8), which is connected to the above mentioned control unit and which is intended to detect a sheet 5, to allow the rollers 6 to be activated. It can detect a sheet 5 passing at both sides of the shaped body 70, through an opening 75 made in the latter.

The developing means 40 furthermore comprises loading means 60 of developing products, fit to fill the developing tank 44 with the right quantities of each of the developing, fixing and washing products, according to an operating sequence that will be explained in more details afterwards.

Said loading means 60 (FIG. 9) comprises three injectors, respectively for developing liquid 61a, for fixing liquid 62a and for washing liquid 63a (see also FIG. 7). They are preferably placed side by side in the upper portion of the thermoregulating container 41, and they communicate with the second hollow 43, thus allowing the developing tank 44 to be filled by gravity.

Connected to each injector is a measuring pump (FIG. 1), whose operation are controlled by the mentioned control unit, and which is fit to supply correct quantities of the product to be introduced in the developing tank.

More particularly, a developing measuring pump 61b is connected to both the developing injector 61a and to a developing liquid container 61c; a fixing measuring pump 62b is connected to both the fixing injector 62a and to a fixing liquid container 62c; a washing measuring pump 63b is connected to both the washing injector 63a and to a washing liquid container 62c.

In the lower portion of the developing tank 44 a draining means 64 are provided, comprising an electrically activated valve 65, a drain conduit 66 and a drain container 67. Said valve 65 connects, when open, the laminar hollow 45 to the drain container 67, allowing the developing products to downflow.

In order to avoid the products to overflow from the second hollow 43, due to some measuring pump trouble, an overload conduit 69 is provided. It communicates with the second hollow 43 via an opening 69a, and it is fit to convey the liquid in excess to the drain container 67.

Figures 10, 12:
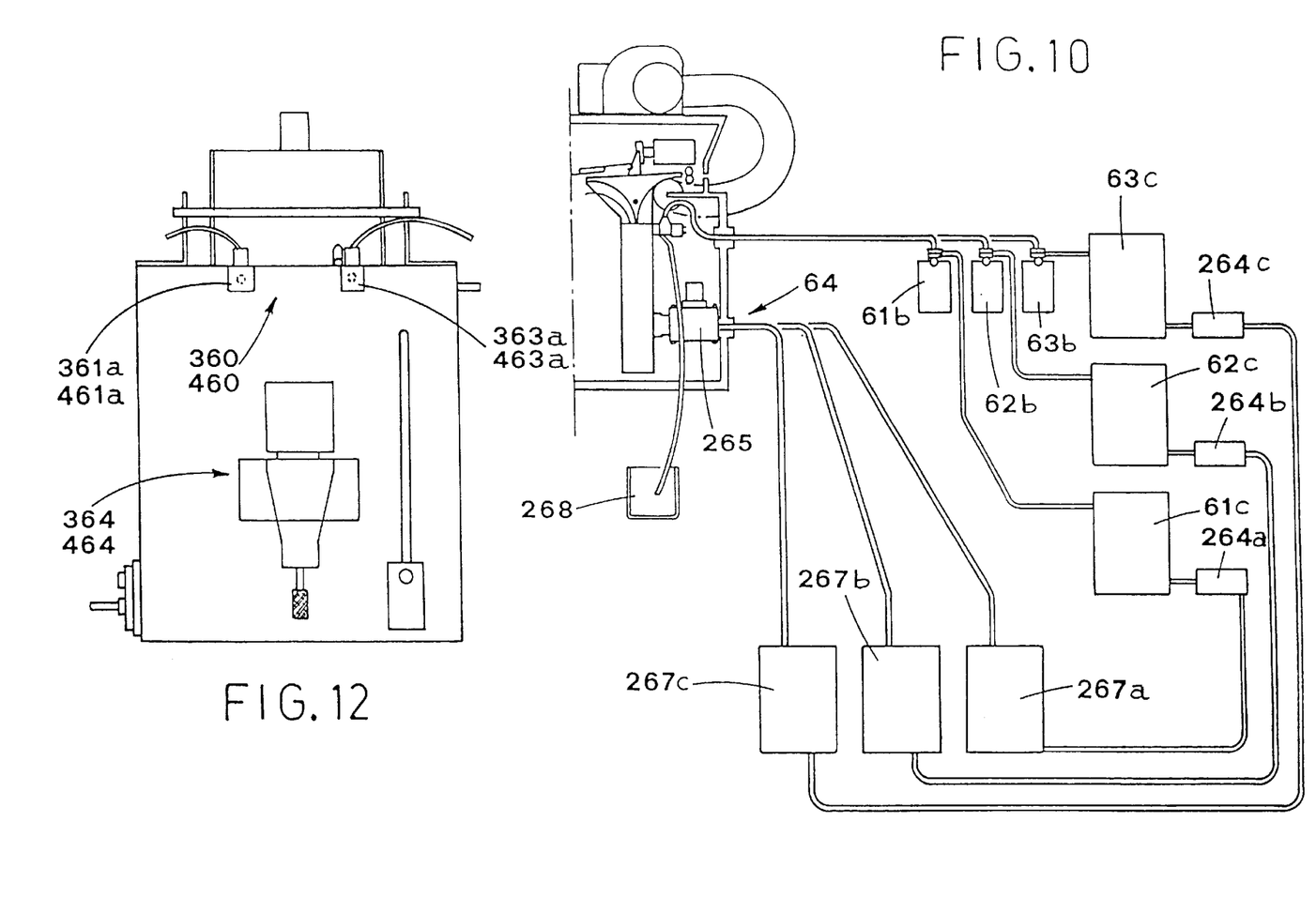
FIG. 10 shows an alternate configuration for the loading means and drain means.
FIG. 12 shows a front view of the developing means of FIG. 11.
Figure 11:
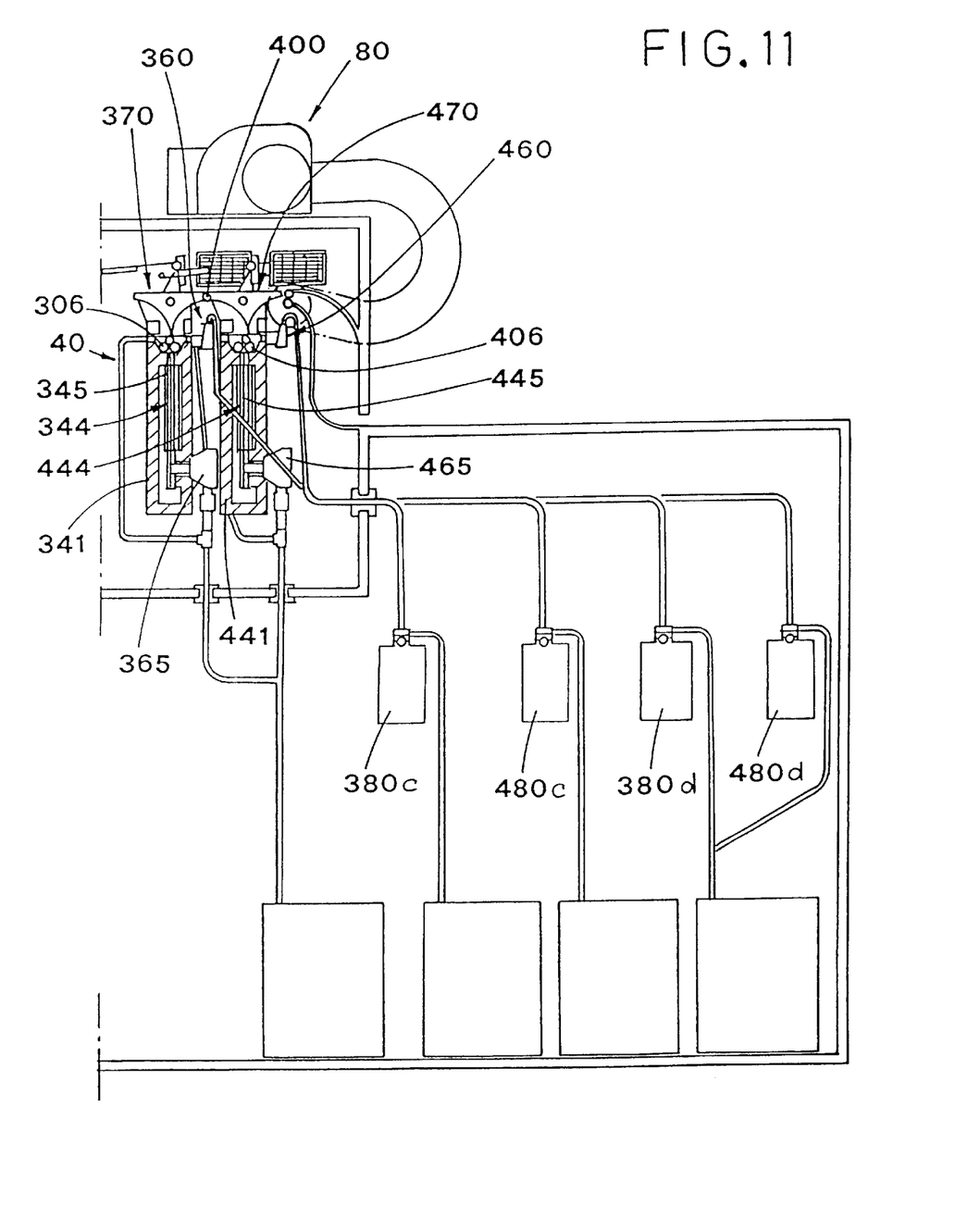
FIG. 11 shows a different embodiment of the developing means.

According to an alternate embodiment of the draining means 64, shown in FIG. 10, the latter comprises an electrically activated valve 265, provided with a flow switcher of the drain flow toward a first drain container 267a, a second drain container 267b or a third drain container 267c. Moreover, the loading means 60 comprises, in addition, a first recycling pump 264a, connecting the first container 267a to the developing liquid container 61c, a second recycling pump 264b, connecting the second container 267b to the fixing liquid container 62c, and a third recycling pump 264c, connecting the third container 267c to the washing liquid container 63c.

An overload container 268 is furthermore provided, fit to receive the overload liquid from the overload conduit 69.

Downstream of the developing means 40, drying means 80 is provided. It comprises an electric thermofan 81 provided with a flexible tube 82, fit to convey a hot air flow toward the area where the sheet goes out from the said developing means 40.

Just downstream of the paper guiding means 70 a pair of output rollers 90 is provided, fit to engage the sheet 5 and to route it towards the outside, through an output opening 91.

The method according to the present invention, which is preferably carried out with the above described apparatus, comprises a series of operating phases occurring sequentially, to obtain an high quality print of an electronically captured image.

The description of said method is made starting from a situation where a end portion 33 of photosensitive medium is already placed at an end of the exposing room 36. The shutter 53 is in a closed position and the paper guiding means 70 is in its input position A.

The operating sequence then begins with the acquisition and digitising of a colour image from a subject, by means of telecamera 1. This is usually accomplished by an operator, but the subject itself could easily do the same operation. A displaying phase follows, wherein the digitised image is permanently stored into the computer 10, and it is also displayed on the primary display 11.

At this point, the subject can interact with the operator, to see whether the image quality is acceptable or not. If not, another image is acquired and displayed, until the subject requirements are satisfied.

Where the photosensitive medium is negative photographic paper or film, the image is then displayed in negative on the secondary monitor 12. Subsequently, an exposing phase the can take place, herein the end portion 33 is exposed, for a period of a pre-defined length, with the light radiation coming from said secondary monitor 12. This comprises several filtered exposing steps.

In a first filtered exposing step, a first primary colour portion of the multiple filter 54 is placed in front of the lens 51, and then the shutter 53 is opened for a first time step, thus exposing the end portion 33 with radiation of said first colour. A second filtered exposing step then follows, in which a second primary colour portion of the multiple filter 54 is placed in front of the lens 51, and the shutter 53 is opened for a second time step. Subsequently, a third filtered exposing step follows, in which a third primary colour portion of the multiple filter 54 is placed in front of the lens 51, and the shutter 53 is opened for a third time step.

Where the photosensitive medium is auto-positive paper or film, the displayed image on the secondary monitor 12 is positive. The exposing phase takes place exactly as described before.

The exposing phase is followed by a feeding of the end portion 33, made by the first pair of dragging rollers 38, to drag it toward the input guiding surface 71 of the paper guiding means 70. The latter routes the said end portion 33 until it is engaged by the second pair of dragging rollers 6.

Subsequently, the cutter 7 is operated, to cut the web 32 in order to separate, from the previously exposed end portion 33, the above mentioned sheet 5 of photosensitive medium, containing the exposed image in a hidden form.

It is to be noted that, at this point, a new end portion 33 of the web 32 is automatically placed in the exposing room 36, in the correct position for a subsequent exposing phase.

The cutting phase of the sheet 5 is followed by a developing phase. The developing tank 44 is now empty, and the draining valve 65 is closed.

When sensor 74 detects a sheet 5, the developing measuring pump 61b is operated, to introduce a correct quantity of developing liquid, from the container 61c to the laminar hollow 45 of the developing tank 44. The second pair of rollers 6 are then operated, in a direction that allows the sheet 5 to be introduced into the said laminar hollow 45.

When sensor 74 stops to detect the sheet 5, the rollers 6 are operated to move it alternately, with short rotations of opposite directions. This allows the said sheet 5 to be alternately moved into the laminar hollow 45, to achieve an homogeneous developing action.

After a pre-defined period, a first draining step is then executed, during which the valve 65 is opened, thus draining the developing liquid toward the drain container 67. The valve 65 is then closed.

A fixing step is then performed, during which the fixing measuring pump 62b is operated to introduce a correct quantity of fixing liquid from fixing container 62c to the laminar hollow 45, to fix the just developed image on sheet 5. This step takes place for another, pre-defined period, after that the valve 65 is opened again, until the laminar hollow 45 is empty.

Subsequently, one or more washing steps are executed, each one of whose comprises filling the laminar hollow 45 with a washing liquid, usually water, by means of the washing measuring pump 63b, and the subsequent opening of the valve 65, to empty the said hollow 45.

The paper guiding means 70 are then switched to their output position B (FIG. 7), the second pair of dragging rollers 6 are operated to drag the sheet 5 to the outside of the developing means 40, until it is engaged by the output rollers 90.

In the above mentioned alternate embodiment of the draining means 64 (FIG. 10), the method according to the present invention differs in draining the laminar hollow 45.

In fact, when the developing liquid is to be drained, the flow switcher valve 265 is operated in order to switch it to the first drain container 267a; when the fixing liquid is drained, it is switched to the second drain container 267b; when the washing liquid is drained, it is switched to the third drain container 267c.

After a pre-defined number of operating cycles, a recycling sequence is then performed. During this sequence, the recycling pumps, respectively first 264a, second 264b and third 264c are operated at the same time, to transfer the developing products from the said first drain container 267a to the developing container 61c, from the second drain container 267b to the fixing container 62c and from the third drain container 267c to the washing container 63c. This allows the developing products to be used until they are totally exhausted. Developing and fixing periods will be accordingly increased by the control unit, in order to keep the print quality as constant as possible.

Subsequently, the thermofan 81 is activated, which generates a hot air flow, through the flexible tube 82, to dry the sheet 5.

The output rollers 90 are then activated and the sheet 5 is conveyed out from the reproduction station 30 through the output opening 91.

A different embodiment of the method according to the present invention comprises interposing, between the displaying phase and the exposing phase, of a further equalisation phase, wherein the image colour balance is modified in the computer 10 by means of a suitable computer program. Equalisation is made in order to compensate the different sensibility of the photosensitive medium to light of different wavelength.

In this case, the exposing phase comprises a first, non-filtered exposing step, during which no filters are used between the monitor 12 and the end portion 33. A second filtered exposing step follows, wherein a red filter is used. This allows to obtain a good colour balancing, while reducing the exposing time.

According to a further different embodiment of the proposed method, the secondary monitor 12 is a monochrome monitor. In this case, the said displaying and exposing phase are partially merged together, and comprise the following steps: displaying of the monochrome component of the image concerning a first primary colour; exposing said first primary colour; displaying of the monochrome component of the image concerning a second primary colour; exposing said second primary colour; displaying of the monochrome component of the image concerning a third primary colour; exposing said third primary colour.

According to the present invention, a later variant of the proposed method must be considered when the alternate embodiment of the secondary display means 12 is applied. Said variant affects the displaying and exposing phases, which will take place as follows.

The computer 10 sends the electronic value for each pixel of the digitised image to the LED bars 142,143,144, according to a pre-defined sequence and with a computed duration. Each LED 145,146,147, while activated, emits a light beam, which is conveyed by a corresponding optical fibre 151 and reaches a corresponding elemental area of the end portion 33. For each pixel, the LED activation time is related to the intensity of the primary colour corresponding to the LED colour.

The computer 10 sends to the LED bars 142,143,144, in parallel, the information concerning pixels belonging to three consecutive transverse strips of the image to be reproduced, respectively to a first strip 172, a second strip 173 and a third strip 174 (see FIG. 15).

Because of the previously described LED arrangement on the said bars 142,143,144, by diagonal groups 185,186,187, for each displaying and exposing step, groups of pixels arranged transversely and diagonally on the three strips 172,173,174 of the end portion 33 are displayed and exposed. Each LED is turned off when it has reproduced on its corresponding elemental area the correct intensity of its primary colour.

When all LEDs have been turned off, the first strip 172 is exposed with the information, concerning the first primary colour, of pixel groups which are arranged according to the LED groups 185 on the first bar 142; the second strip 173 is exposed with the information, concerning the second primary colour, of pixel groups which are arranged according to the LED groups 186 on the second bar 143; the third strip 174 is exposed with the information, concerning the third primary colour, of pixel groups which are arranged according to the LED groups 187 on the third bar 144.

At the end of this step, the end portion 33 is fed by the first pair of rollers 38, for a length which is equal to the distance between two consecutive longitudinal LED rows 195,196, 197. The computer 10 then sends to the LED bars 142,143, 144 the information concerning pixels which are immediately subsequent to those previously exposed, according to the particular LED arrangement. Because of that, in this phase both new elemental areas 106 of the end portion 33 are exposed, together with elemental areas 106 which were already exposed with a different colour.

The above described steps, each one of whose comprising exposing and feeding the end portion 33, are cyclically repeated, so as each elemental area 106 is subsequently exposed with the information concerning the correct value of each primary colour of the corresponding picture.

When the last strip of image has been completely exposed, the motor 38a is activated again, in order to drag all the end portion 33 downstream to the cutter 7.

In the further embodiment of the secondary display means 12 described above, the light information regarding each transversal image strip 172,173,174 is transferred to the end portion 33 according to a pre-defined number of steps. In each of these steps the pixel information concerning image elemental areas 106 corresponding to LED groups 185,186, 187 are sent to the LED bars 142,143,144. These are then shifted crosswise in the W direction, together with the conveying means 50, of a pre-defined distance, which is equal to the distance between two consecutive image elemental areas 106. Once the last step has been executed, and the whole strips have been exposed, bars 142,143,144 and conveying means 50 are shifted back to their original position. The motor 38a is then activated, to shift the end portion 33 longitudinally of a distance which is equal to a strip width. The exposing step can then start again.

The advantages which have been achieved with the present invention consist in proposing a method, together with an apparatus to carry it out, which allows to print an image only after completely satisfactory shot and sitting have been taken, and after the subject has agreed about it. This totally eliminates both time and materials wasting.

A further advantage is to produce photographic quality prints on paper or film at a fraction of the cost obtainable with other methods of known art, and in a greatly automated way.

A further advantage consists in that developing the photosensitive medium according to the present invention is highly efficient and cost effective, because of the very small size of the laminar hollow 45 (whose volume is usually only 10 cubic centimeters). Consequently, the developing tank 44 requires a small amount of energy to be kept at a constant temperature.

Moreover, all the above described features give another advantage, because they allow to build an automatic apparatus which is also extremely compact and easily transportable. It can also easily housed inside a photographic studio.

I claim:

1. A method for acquiring and printing images on a photosensitive medium comprising, in sequence:
    electronically acquiring and digitizing a color image;
    storing the image in a computer (10);
    displaying the image on primary display means (11);
    sending the image to a reproduction station (30), and displaying the image on secondary display means (12);
    exposing an end portion (33) of a photosensitive medium web (32) to light radiation coming from said secondary display means (12), the light radiation passing through conveying means (50), to form an exposed image thereon;
    cutting the end portion (33) to separate a single sheet (5) containing the exposed image;
    feeding said sheet (5) into a laminar hollow (45) of a single tank developing means (40);
    developing said sheet (5) in said laminar hollow (45), by successively executing a developing step, a fixing step and a washing step, moving the sheet back and forth within said laminar hollow (45);
    feeding the sheet (5) out of said laminar hollow (45); and, drying the sheet (5).

2. The method according to claim 1, wherein displaying the color image occurs subsequently to storing the color image.

3. The method according to claim 1, further comprising, subsequent to displaying the image and before exposing the end portion, processing and retouching the image in said computer (10).

4. The method according to claim 1 wherein the color image is displayed on said secondary display means (12) in a negative form, and wherein exposing the end portion comprises first exposing the end portion for a first pre-defined period of time, to the image to be printed, filtering for a first primary color; second exposing the end portion for a second pre-defined period of time, to the image, filtering for a second primary color; third exposing the end portion for a third pre-defined period of time, to the image, filtering for a third primary color.

5. A method for acquiring and printing images on a photosensitive medium comprising:

electronically acquiring and digitizing a color image;

storing the image in a computer (10);

displaying the image on primary display means (11);

sending the image to a reproduction station (30), and displaying the image on secondary display means (12);

exposing an end portion (33) of a photosensitive medium web (32) to light radiation coming from said secondary display means (12), the light radiation passing through conveying means (50), to form an exposed image thereon;

cutting the end portion (33) to separate a single sheet (5) containing the exposed image;

feeding said sheet (5) into a laminar hollow (45) of a single tank developing means (40);

developing said sheet (5) in said laminar hollow (45), by successively executing a developing step, a fixing step and a washing step, always keeping the sheet (5) in said laminar hollow (45);

feeding the sheet (5) out of said laminar hollow (45);

drying the sheet (5); and, prior to exposing the end portion, performing image equalization for at least two primary colors, the exposing times for the at least two primary colors being equal, and wherein exposing the end portion comprises first non-filtered exposing the end portion for the at least two primary colors for a first predefined period of time, and second filtered exposing the end portion for a third primary color, for a second predefined period of time.

6. A method for acquiring and printing images on a photosensitive medium comprising:

electronically acquiring and digitizing a color image;

storing the image in a computer (10);

displaying the image on primary display means (11);

sending the image to a reproduction station (30), and displaying the image on secondary display means (12);

exposing an end portion (33) of a photosensitive medium web (32) to light radiation coming from said secondary display means (12), the light radiation passing through conveying means (50), to form an exposed image thereon;

cutting the end portion (33) to separate a single sheet (5) containing the exposed image;

feeding said sheet (5) into a laminar hollow (45) of a single tank developing means (40):

developing said sheet (5) in said laminar hollow (45), by successively executing a developing step, a fixing step and a washing step, always keeping the sheet (5) in said laminar hollow (45);

feeding the sheet (5) out of said laminar hollow (45);

drying the sheet (5); and, wherein displaying the image and exposing the end portion occur together and comprise in sequence: first monochrome displaying of a first primary color of the image to be printed; first exposing the end portion, filtering for a first primary color and for a first pre-defined period of time; second monochrome displaying of a second primary color of the image to be printed; second exposing the end portion, filtering for a second primary color and for a second pre-defined period of time; third monochrome displaying of a third primary color of the image to be printed; third exposing the end portion, filtering for a third primary color, for a third pre-defined period time.

7. An apparatus electronically acquiring images and for printing them on a photosensitive comprising:

electronic input means (1) for electronically acquiring an image;

a computer (10) for storing and processing the acquired image; primary display means (11) connected to said computer; a reproduction station (30) for receiving the image from said computer (10) and for printing the image on a sheet (5) of photosensitive medium, said reproduction station having a chassis (31) enclosing secondary display means (12), connected to said computer (10), for displaying the image stored therein;

a web (32) of photosensitive medium, conveying means (50), for conveying the web of photosensitive medium, the conveying means being transparent to light radiation coming from said secondary display means, the web conveyed towards an exposing room (36), the web having an end portion (33) which is placed at the end of said exposing room (36) for receiving light radiation from said secondary display means;

a cutter (7) and a first pair of rollers (38) for separating the end portion containing the exposed image, forming a single sheet (5) of photosensitive medium;

single sheet, single tank developing means (50) for receiving said sheet (5) and developing the image;

roller means for moving the single sheet back and forth within the single sheet, single tank developing means; and, drying means (80) for drying the sheet (5).

8. The apparatus according to claim 7 wherein the secondary display means (12) is a color computer monitor.

9. The apparatus according to claim 7 further comprising a mirror (14) provided between the secondary display means (12) and conveying means (50), to allow said secondary display means (12) to be oriented at a pre-defined angle with respect to said conveying means (50).

10. The apparatus according to claim 7 wherein the conveying means further comprises a lens (51), a shutter (53) and a multiple filter (54).

11. The apparatus according to claim 7 wherein the electronic input means (1) is a video camera.

12. The apparatus according to claim 7 wherein the electronic input means (1) is a digital image scanner.

13. The apparatus according to claim 7 wherein the electronic input means is a computer mass memory device.

14. The apparatus according to claim 7 further comprising a sliding guide (100) for locating the web end portion in front of a first opening 35 in the exposing room.

15. The apparatus of claim 14 wherein the sliding guide (100) has a convex shape.

16. An apparatus for electronically acquiring images and for printing them on a photosensitive medium comprising:

electronic input means (1) for electronically acquiring an image;

a computer (10) for storing and processing the acquired image; primary display means (11) connected to said computer; a reproduction station (30) for receiving the image from said computer (10) and for printing the image on a sheet (5) of photosensitive medium, said reproduction station having a chassis (31) enclosing secondary display means (12), connected to said computer (10), for displaying the image stored therein;

a web (32) of photosensitive medium, conveying means (50), for conveying the web of photosensitive medium, the conveying means being transparent to light radiation coming from said secondary display means, the web conveyed towards an exposing room (36), the web having an end portion (33) which is placed at the end of said exposing room (36) for receiving light radiation from said secondary display means;

a cutter (7) and a first pair of rollers (38) for separating the end portion containing the exposed image, forming a single sheet (5) of photosensitive medium;

single sheet, single tank developing means (50) for receiving said sheet (5) and developing the image;

drying means (80) for drying the sheet (5), wherein the secondary display means (12) is a back-lit, liquid crystal color monitor having a back-lighting lamp (13), a multiple filter (54), interposed between the liquid crystal color monitor (12) and the back-lighting lamp (13).

17. An apparatus for electronically acquiring images and for printing them on a photosensitive medium comprising:

electronic input means (1) for electronically acquiring an image;

a computer (10) for storing and processing the acquired image; primary display means (11) connected to said computer; a reproduction station (30) for receiving the image from said computer (10) and for printing the image on a sheet (5) of photosensitive medium, said reproduction station having a chassis (31) enclosing secondary display means (12), connected to said computer (10), for displaying the image stored therein;

a web (32) of photosensitive medium, conveying means (50), for conveying the web of photosensitive medium, the conveying means being transparent to light radiation coming from said secondary display means, the web conveyed towards an exposing room (36), the web having an end portion (33) which is placed at the end of said exposing room (36) for receiving light radiation from said secondary display means;

a cutter (7) and a first pair of rollers (38) for separating the end portion containing the exposed image, forming a single sheet (5) of photosensitive medium;

single sheet, single tank developing means (50) for receiving said sheet (5) and developing the image; and, drying means (80) for drying the sheet (5), wherein the secondary display means consist of a plurality of LED bars (142,143,144), placed side by side and driven by driving means (160) to display light radiation, each bar being provided with a plurality of LEDs (145,146,147), the LED bars (142,143,144) being arranged in front and transversely with respect to said end portion (33), the bars extended substantially for the whole width of the end portion, each of the LED bars displaying light radiation of a different primary color, relative to the other LED bars, of a plurality of image pixels belonging to a transverse strips (172,173,174) of the image to be printed, and each bar being provided with a filter (242,243,244) for filtering the same primary color, said conveying means being a sheaf (150) of optical fibers (151), which convey light information generated by said LED (145,146,147) towards a corresponding area (106) of the end portion (33).

18. The apparatus according to claim 17 wherein the LEDs (145,146,147) are diagonally arranged on each one of said LED bars (142,143,144) in consecutive, longitudinally arranged groups (185,186,187).

19. The apparatus according to claim 17 wherein the driving means (160) is a computer board in the computer (10).

20. The apparatus according to claim 17 wherein the LED bars (142,143,144) are movable in a direction which is perpendicular with respect to a conveying direction of the web of photosensitive medium.

21. The apparatus according to claim 17 wherein the conveying means (50) are movable in direction which is perpendicular with respect to a conveying direction of the web of photosensitive medium.

22. An apparatus for electronically acquiring images and for printing them on a photosensitive medium comprising:

electronic input means (1) for electronically acquiring an image;

a computer (10) for storing and processing the acquired image; primary display means (11) connected to said computer; a reproduction station (30) for receiving the image from said computer (10) and for printing the image on a sheet (5) of photosensitive medium, said reproduction station having a chassis (31) enclosing secondary display means (12), connected to said computer (10), for displaying the image stored therein;

a web (32) of photosensitive medium, conveying means (50), for conveying the web of photosensitive medium, the conveying means being transparent to light radiation coming from said secondary display means, the web conveyed towards an exposing room (36), the web having an end portion (33) which is placed at the end of said exposing room (36) for receiving light radiation from said secondary display means;

a cutter (7) and a first pair of rollers (38) for separating the end portion containing the exposed image, forming a single sheet (5) of photosensitive medium;

single sheet, single tank developing means (50) for receiving said sheet (5) and developing the image; and, drying means (80) for drying the sheet (5), wherein the said single sheet, single tank developing means (40) has a thermoregulated container (41) having a first hollow (3) for containing a thermoregulating means (46), the container housing a developing tank (44) having a laminar hollow (45), the developing tank communicating through an upper side thereof and housing developing products and a sheet (5) of photosensitive medium, in order to develop the sheet; at least a second pair of rollers (6), longitudinally arranged immediately over the developing tank (44) and aligned with the laminar hollow (45), for engaging and dragging the sheet (5) into and out of the laminar hollow (45); paper guiding means (70), arranged immediately over the second pair of rollers (6) for routing the sheet (5) towards the second pair of rollers; developing product loading means (60) for placing measured quantities of developing products into the developing tank (44); and, draining means (64) for draining the developing products from said developing tank (44).

23. The apparatus according to claim 22 wherein the developing means further comprise sensor means (74), placed immediately above the second pair of rollers (6), for detecting the presence of the sheet (5).

24. The apparatus according to claim 22 wherein the paper guiding means (70) comprise a pivotable shaped body, which pivots in coordination with the second pair of rollers (6), between an input position A, in which the sheet (5) is routed toward the rollers (6), and an output position B, in which the sheet (5) is routed away from the rollers (6), the shaped body (70) having an input guiding surface (71) and an output guiding surface (72), which together extend toward the second pairs of rollers (6), the guide surfaces converging, immediately above the second pair of rollers to form a cusp (73).

25. The apparatus according to claim 22 wherein the thermoregulating means (46) comprise at least a heating power resistor (47) for heating a thermoregulating fluid contained inside the thermoregulating container (41), and at least a temperature sensor (48).

26. The apparatus according to claim 22 wherein the thermoregulating means (46) comprises a laminar heating power resistor, directly coupled to the developing tank (44) and operated without any thermoregulating fluid.

27. The apparatus according to claim 25 wherein the thermoregulating container (41) further comprises a recycling pump (49) for recycling the thermoregulating fluid.

28. The apparatus according to claim 22 wherein the developing product loading means comprise:

a developing injector for injecting developing liquid (61a) into the developing tank, a developing liquid measuring pump (61b) connected to the developing injector and to a developing liquid container (61c);

a fixing injector for injecting fixing liquid (62a) into the developing tank, a fixing measuring pump (62b) connected to the fixing injector and to a fixing liquid container (62c); and, a wash injector for injecting washing liquid (63a) into the developing tank, a washing measuring pump (63b) connected to the wash injector and to a washing liquid container (63c).

29. The apparatus according to claim 22 wherein the draining means (64) comprise an electrically activated valve (65), a drain conduit (66) and a drain container (67).

30. The apparatus according to claim 28 wherein the draining means (64) is a flow switcher valve (265) for switching a draining flow to either a first draining container (267a), a second draining container (267b) or a third draining container (267c), and wherein the loading means (60) further comprises a first recycling pump (264a), connecting the first draining container (267a) to the developing liquid container (61c), a second recycling pump (264b), connecting the second draining container (267b) to the fixing liquid container (62c), and a third recycling pump (264c), connecting the third draining container (267c) to the washing liquid container (63c).

* * * * *